Jan. 1, 1963     J. S. LEICH     3,071,416
WHEEL COVER

Filed Nov. 13, 1961     4 Sheets-Sheet 1

INVENTOR.
JOSEPH S. LEICH
BY Cullen & Cantor
ATTORNEYS

Jan. 1, 1963   J. S. LEICH   3,071,416
WHEEL COVER

Filed Nov. 13, 1961   4 Sheets-Sheet 2

INVENTOR.
JOSEPH S. LEICH
BY
ATTORNEYS

Jan. 1, 1963 J. S. LEICH 3,071,416
WHEEL COVER
Filed Nov. 13, 1961 4 Sheets-Sheet 3
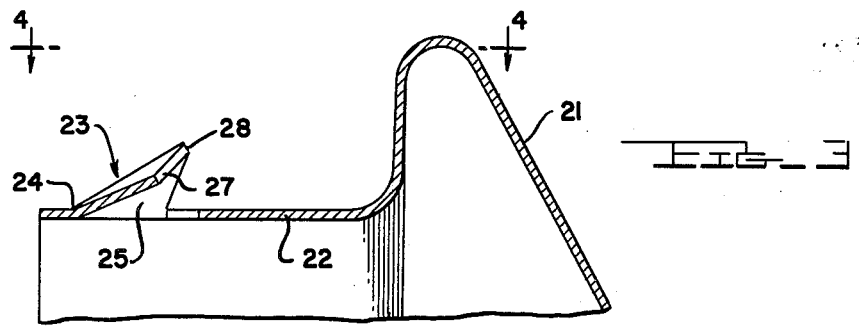
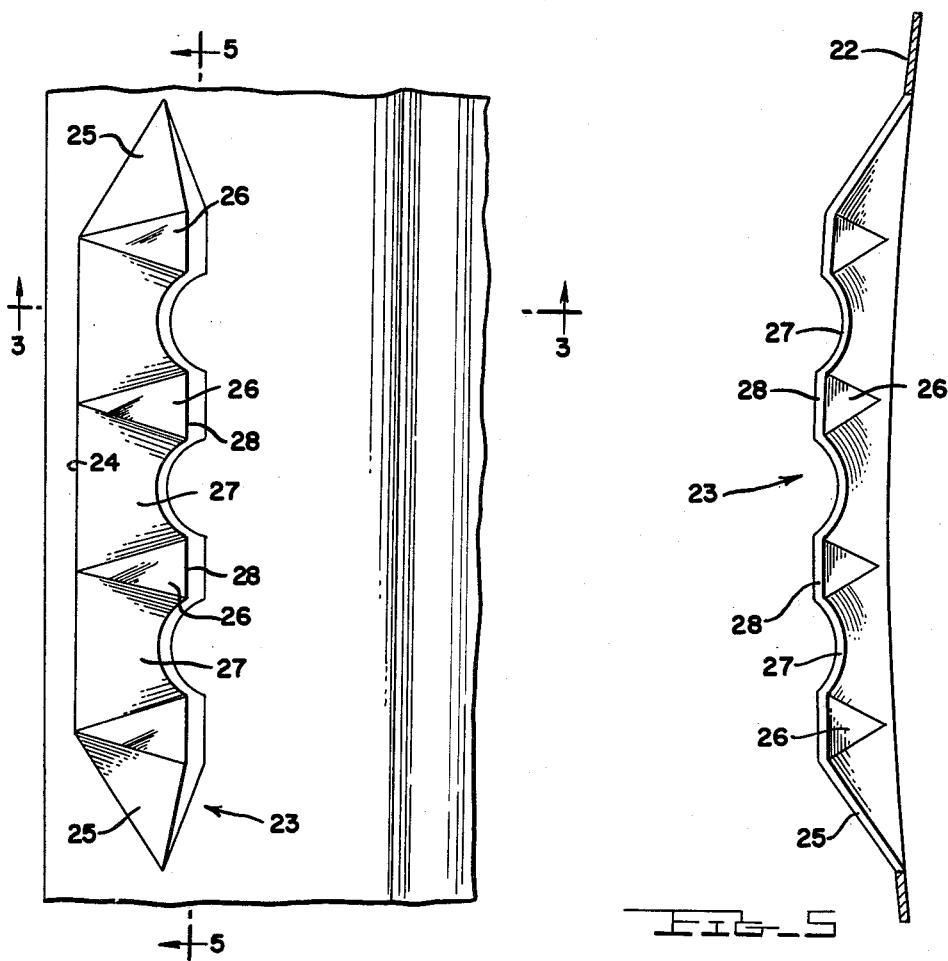
INVENTOR.
JOSEPH S. LEICH
BY
ATTORNEYS Jan. 1, 1963 J. S. LEICH 3,071,416
WHEEL COVER
Filed Nov. 13, 1961 4 Sheets-Sheet 4
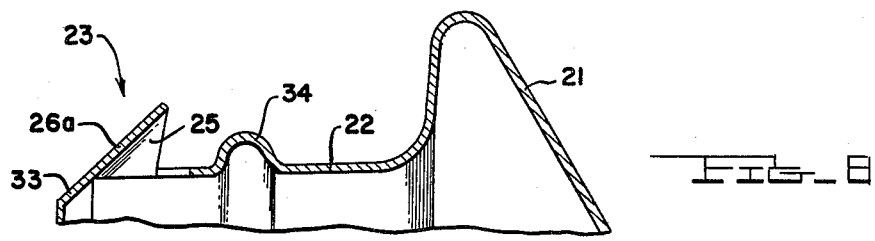
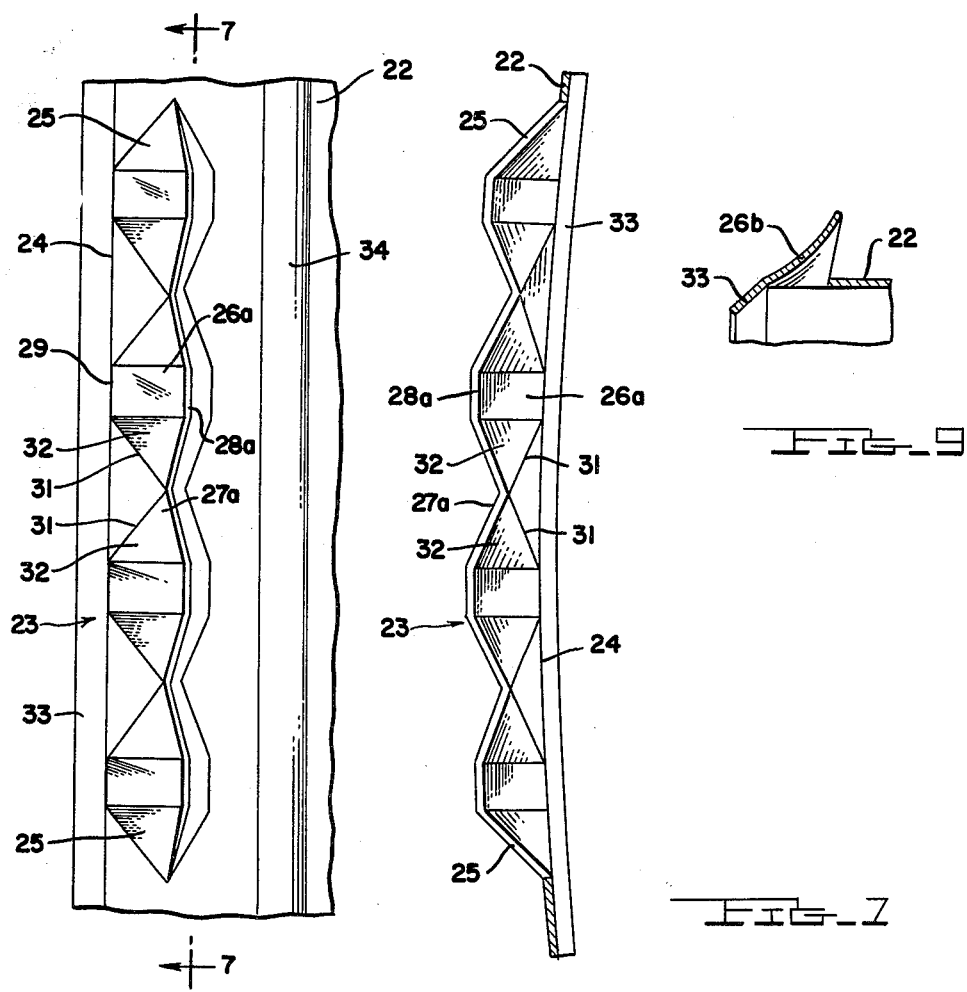
INVENTOR.
JOSEPH S. LEICH
BY Cullen & Canton
ATTORNEYS

United States Patent Office 3,071,416
Patented Jan. 1, 1963

3,071,416
WHEEL COVER
Joseph S. Leich, Birmingham, Mich., assignor to National Manufacturing Company, Detroit, Mich., a corporation of Michigan
Filed Nov. 13, 1961, Ser. No. 151,644
4 Claims. (Cl. 301—37)

This invention relates to a wheel cover of the type used in conjunction with a vehicle wheel.

Conventional wheel covers, formed in a dish or disk-like shape, are commonly used on automotive type vehicles to cover the exposed face of the wheel, to cover and protect the wheel hub, etc. These are frequently secured to the wheel by a fastening means which connects to the inner surface of the wheel rim. Prior fastening means have generally been relatively expensive or have not had sufficient strength and locking force to be effective over a long period of time during which the cover is used.

Thus, it is an object of this invention to form a wheel cover having an integral fastening means for securing the cover to the inside surface of the tire rim, which fastening means is stamped or struck-out of the cover and hence is simple and inexpensive, and which means so tightly grips against the rim that it cannot be accidentally disengaged despite the vibrations, impacts and wear that a wheel encounters.

These and other objects and advantages of this invention will become apparent upon reading the following description of which the attached drawings form a part.

In these drawings:

FIG. 3 is an enlarged cross-sectional view of a portion of the wheel cover taken along arrows 3—3 of FIG. 4.

FIG. 4 is a view taken in the direction of arrows 4—4 of FIG. 3.

FIG. 5 is a view taken in the direction of arrows 5—5 of FIG. 4.

FIG. 6 is a view similar to FIG. 4, but shows a modified form of tooth.

FIG. 7 is a view taken on arrows 7—7 of FIG. 6.

FIG. 8 is a view similar to FIG. 3, but showing the modification of FIGS. 6 and 7.

FIG. 9 is a view similar to FIG. 8, but shows a further modified form of tooth.

Figure 1:
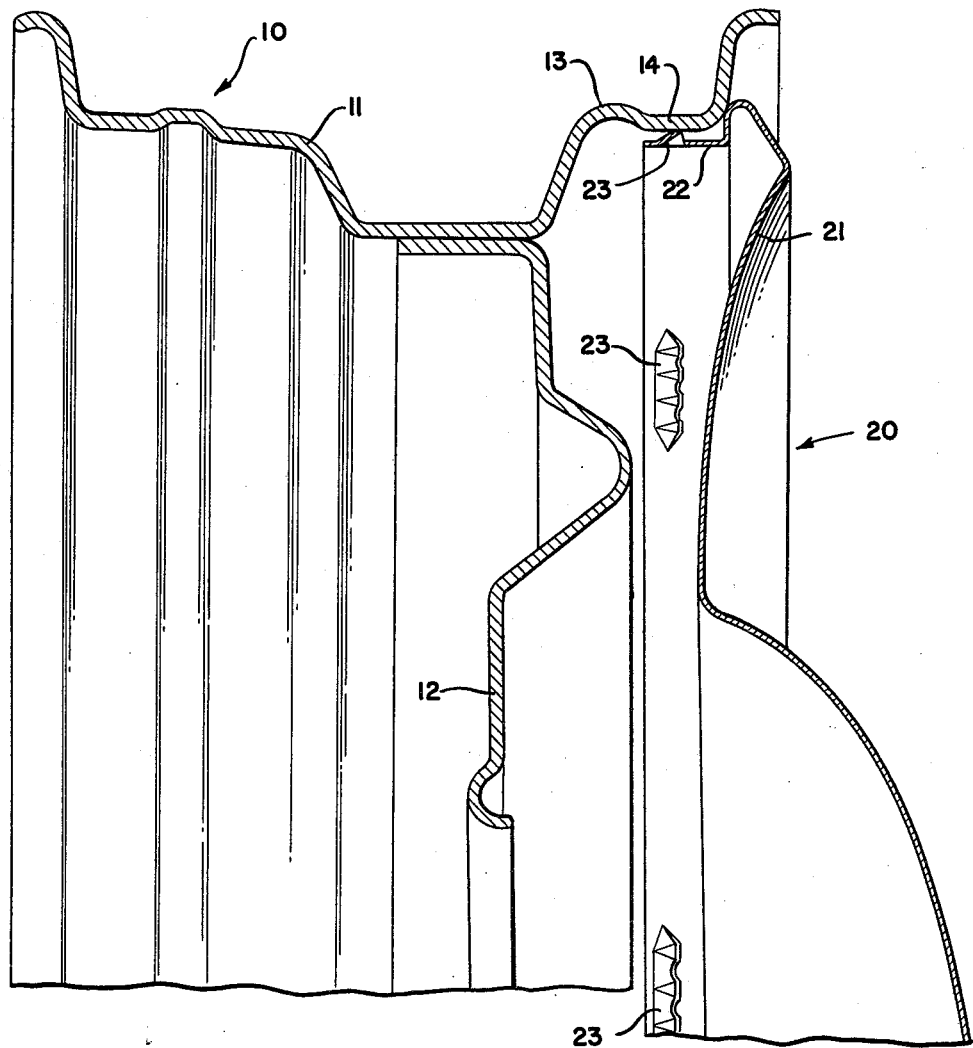
FIG. 1 is a cross-sectional elevational view of a portion of an automotive vehicle wheel with the wheel cover secured thereto.
Figure 2:
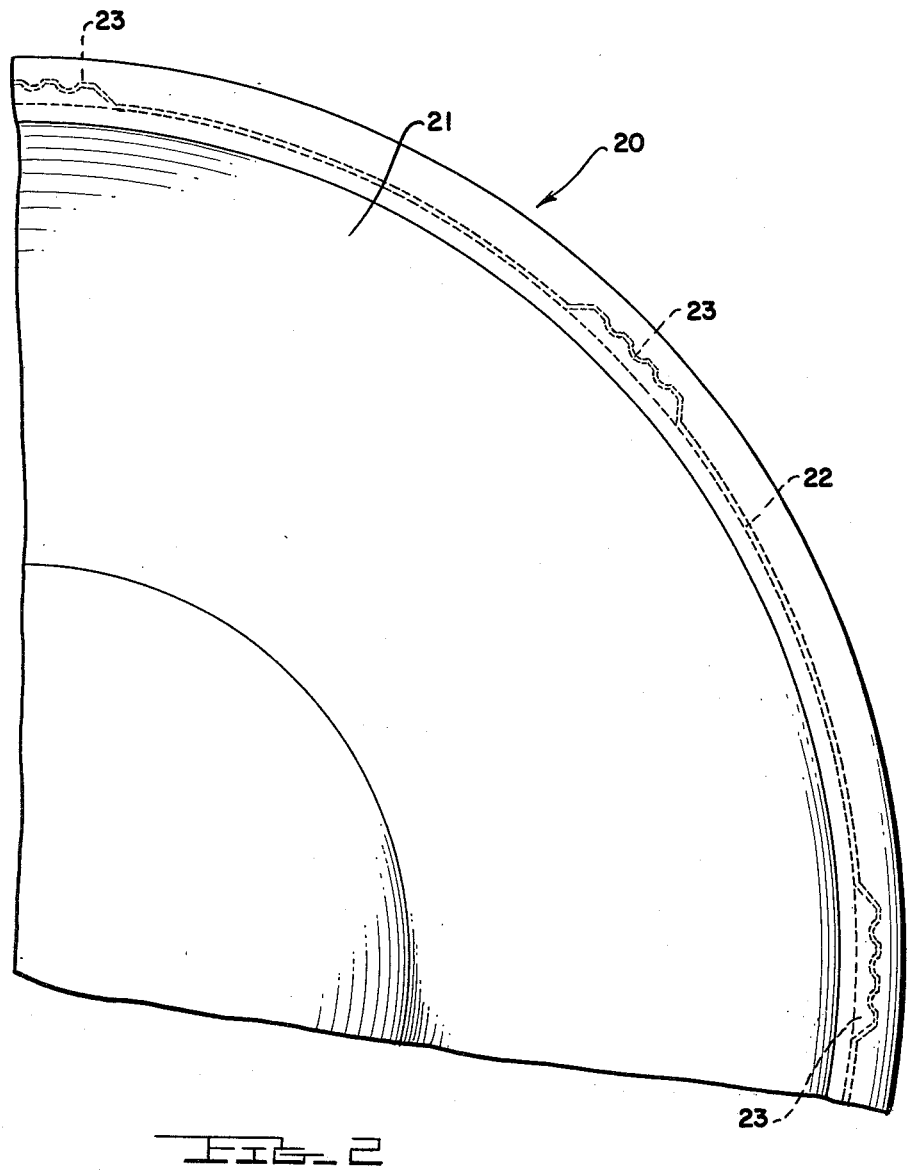
FIG. 2 is a front elevational view of a fragment of the wheel cover, per se.

In FIG. 1 a conventional automobile wheel 10 is illustrated in cross-section. The wheel includes a conventional outer tire rim 11 secured to a central body 12. The rim is formed with a safety bead 13, spaced from one edge of the rim, and an annular inner rim surface portion 14.

The wheel cover 20 is formed as a one-piece stamping of thin sheet metal in the shape of a dished or disk-like body portion 21, which may be bent into some decorative configuration, whose peripheral edge is rearwardly bent to form a continuous, annular flange 22. The flange is arranged to be inserted within the rim adjacent to the inner surface 14 and is of a diameter which is slightly less than the diameter of said surface.

To secure the cover to the rim, fastening means in the form of a struck-out tooth configuration 23 is provided intermediate the ends of the flange and is so formed that it will bitingly engage the rim surface 14 to thus lock the flange to the rim.

As shown in FIGS. 3–5, the struck-out toothed configuration 23 is in the form of a circumferentially elongated, struck-out portion, having one long edge 24 integral with the flange near the free edge of the flange, and sloped outwardly of the flange at an acute angle thereto so that the other long free edge faces towards the plane of the cover body. The sides of the struck-out portion are integral with the flange at 25.

The free edge of the struck-out portion is formed as teeth 26, each being triangular in shape with the base of the triangle forming a straight, blunt edge 28 and the apex of the triangle coinciding with the integral edge 24. There are at least two and preferably three or four teeth formed out of each struck-out portion and these teeth are interconnected by inwardly bowed webs 27 (see FIG. 5).

The struck-out portions are regularly spaced apart around the periphery of the flange, with as many being used as needed for any particular type of wheel.

In operation, the wheel cover is aligned with the wheel and its flange is pushed inwardly of the rim so that the teeth 26 are force-fitted within the rim and the blunt edges 28 of each tooth press against and is locked to the rim surface 14. The teeth are resiliently movable towards and away from the flange to thus accommodate to irregularities of the rim and the bowed webs, acting as springs, increase their bow when the teeth move inwardly towards the flange, in addition to stiffening the teeth and holding them tightly outwardly against the rim.

Thus, the rim is engaged by the teeth in a number of places, with each tooth independently gripping against the rim to thus prevent accidental removal of the wheel cover from the rim. When it is desired to remove the cover, a tool must be used to pry the cover off the wheel in the conventional manner.

FIGS. 6, 7 and 8 illustrate a modification, wherein the teeth 26a each are formed in an elongated rectangular shape having one of its short edges 29 integral with flange 22 at the long edge 24 of the toothed configuration and its opposite short edge 28a forming the blunt biting edge. The webs 27a are provided with bent lines 31 to form triangle shapes 32 in each web. In addition, the edge of the flange 22 is bent inwardly to form an edge rim 33 arranged at an angle corresponding to the slope of the teeth 26a. Also, a continuous bead 34 is rolled into flange 22 between the teeth and the body of the wheel cover.

FIG. 9 illustrates a modification wherein each tooth 26b (which could be triangular shaped as the teeth 26 of FIGS. 1–5 or rectangular shaped as the teeth 26a of FIGS. 6–8) are inwardly bowed or bent, thus providing a greater stiffness or rigidity to the teeth.

This invention may be further developed within the scope of the following attached claims. Accordingly, it is desired that the foregoing description be read as being merely illustrative of an operative embodiment of this invention.

I now claim:

1. A wheel cover for a vehicle wheel having a tire rim, comprising a relatively thin sheet metal disk-like body of a size to substantially cover the wheel and having an integral, annular, axially directed flange bent from the peripheral edge of the body, the diameter of the flange being slightly less than the inner diameter of the rim; means formed on the flange intermediate its opposite edges for fastening the flange to the wheel rim; said means comprising circumferentially elongated portions struck out of the flange at regularly spaced intervals, the portions each having one long edge integral with the flange near the free edge of the flange and being sloped outwardly of the flange at an acute angle relative thereto so that its other long edge is spaced from the flange and is directed towards the plane of the body of the cover, and is cut in the form of at least one pair of adjacent teeth interconnected by an integral web which is inwardly bowed towards the flange, the teeth being resiliently movable towards and away from the flange with the web acting as a spring, whereby the flange may be inserted within the rim with the teeth in forced contact with the inner surface of the rim for bitingly engaging said surface and thus locking the flange within the rim.

2. A wheel cover for a vehicle wheel having a tire rim, comprising a relatively thin sheet metal body of a size to substantially cover the wheel and having an integral, annular, axially directed flange bent from the peripheral edge of the body, the diameter of the flange being slightly less than the inner diameter of the rim; tooth means formed on the flange for fastening the flange within the wheel rim, said tooth means comprising circumferentially elongated portions struck out of the flange at regularly spaced intervals, the portions each having one long edge and its opposite ends integral with the flange near the free edge of the flange, each portion being sloped outwardly of the flange so that its other long edge is spaced from the flange and is formed in the shape of at least one pair of adjacent teeth, each having substantially straight, blunt ends and being interconnected by an integral web which is bowed inwardly towards the flange, the teeth being resiliently bendable towards and away from the flange, whereby the flange may be inserted within the rim with the teeth in forced contact with the inner surface of the rim for bitingly engaging said surface and locking the flange within the rim.

3. A construction as defined in claim 2, and said teeth each being triangular in shape, with the base of the triangle at said other long edge and forming the biting edge of the tooth, and the apex of the triangle being at the edge integral with the flange.

4. A construction as defined in claim 2, and each of said teeth being rectangular in shape, and having one short edge which coincides with said portion long edge which is integral with the flange, and an opposite short edge forming said blunt end.

References Cited in the file of this patent

UNITED STATES PATENTS

| | | |
|---|---|---|
| 2,669,487 | Horn | Feb. 16, 1954 |
| 2,698,203 | Landell | Dec. 28, 1954 |
| 2,828,160 | Lyon | Mar. 25, 1958 |
| 2,911,258 | Lyon | Nov. 3, 1959 |
| 2,939,743 | Lyon | June 7, 1960 |
| 2,964,355 | Buerger | Dec. 13, 1960 |

FOREIGN PATENTS

| | | |
|---|---|---|
| 1,129,514 | France | Sept. 10, 1956 |